June 19, 1956  C. M. BROWNE  2,750,637
MULTIPLE SHEET GLAZING UNITS
Filed Nov. 28, 1952

Inventor
Charles M. Browne
By Nobbe & Swope
Attorneys

United States Patent Office 2,750,637
Patented June 19, 1956

2,750,637

MULTIPLE SHEET GLAZING UNITS

Charles M. Browne, Toledo, Ohio, assignor to Libbey-Owens-Ford Glass Company, Toledo, Ohio, a corporation of Ohio Application November 28, 1952, Serial No. 323,081

9 Claims. (Cl. 20—56.5)

This invention relates broadly to multiple glass sheet glazing units and, more particularly, to units of this type having plastic separator means.

Multiple sheet glazing units may be described generally as comprising two or more sheets of glass which are sealed in spaced relation entirely around their marginal portions by a separator strip disposed between and bonded to said sheets to enclose an hermetically sealed dead air space. Due principally to their insulating and condensation preventing qualities, such units have become well established in the building trades and have found wide usage as windows for buildings, show cases, vehicles, refrigerators, and the like.

Ordinarily, when so used, one sheet of glass is subjected to a different temperature than that to which the other sheet or sheets may be exposed. Due to these temperature differentials, one sheet tends to expand or contract to a greater or less degree than the other. As a result, there is a decided strain or stress upon the bond between the sheets and the separator strip.

This problem was discussed in detail in Patent No. 2,235,681 to C. D. Haven et al., wherein the patentees disclosed means for permanently bonding the margins of glass sheets with separator strips of lead tape to provide an hermetically sealed double glazed unit which would withstand the stresses and strains aforenoted. A lead tape was preferred as a separator strip due to its ductility and thus its adaptability to the relative expansion and contraction of the glass sheets. It was also noted by the patentees that multiple sheet glazing units employing organic separator means were not always found dependable, principally because of the breakdown of the bond between the organic separating means and the bonding material itself. As well, of course, although they may be bonded directly to glass, organic materials such as plastics are not water vapor proof. Respite the fact that strips of a plastic are sufficiently flexible to provide excellent means for separating the glass sheets of double glazed units, the prior art is not instructive of completely satisfactory units made up in this manner.

It is, therefore, an object of this invention to provide an hermetically sealed multiple sheet glazing unit having plastic separator means.

Another object of this invention is to provide a multiple glass sheet glazing unit having a plastic separator strip permanently bonded to the glass sheets thereof.

Still another object of this invention is to provide a multiple glass sheet glazing unit comprising spaced sheets of glass joined at their marginal areas by water vapor proof plastic separator strips.

Still another object of this invention is to provide a bond between a glass sheet and a plastic member which is water vapor proof.

According to this invention, spaced sheets of glass are joined at their marginal portions by plastic separator strips in a manner to provide hermetically sealed glazing units. The edges of the plastic separator strips are permanently bonded to the marginal portions of said sheets through the intermediary of metallic coatings on said marginal portions as well as on the edges of the strip. Specifically, said plastic strip is specially prepared with a solderable metallic coating, as described hereinafter, and the marginal portions of the glass sheets are provided with metallic coatings, as disclosed in the aforementioned Patent No. 2,235,681, such that when said coatings are soldered together, the seal therebetween will be water vapor tight.

In the drawings, wherein like numerals are employed to designate like parts throughout the same:

Figure 1:
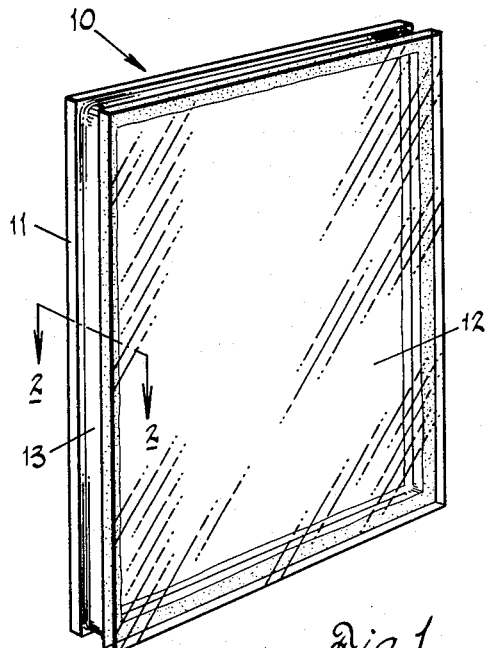
Fig. 1 is a perspective view of a multiple glass sheet glazing unit constructed in accordance with this invention.
Figure 2:
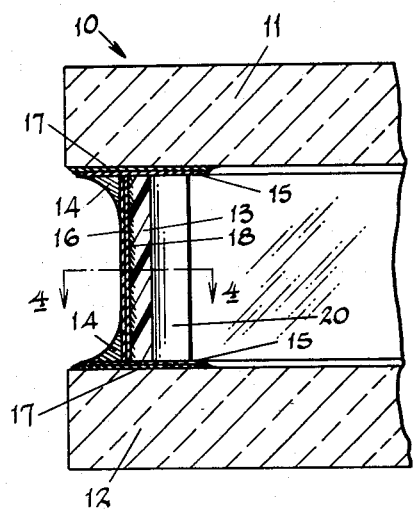
Fig. 2 is an enlarged sectional view of a portion of the unit taken along line 2—2 of Fig. 1.

Referring now in detail to the drawings, and particularly to Fig. 1, there is shown a multiple glass sheet glazing unit constructed in accordance with this invention and designated in its entirety by the numeral 10. This unit is composed of two sheets of glass 11 and 12 which are spaced apart and joined together at their marginal portions by a separator strip 13 to form an enclosed space therebetween. As shown in Fig. 2, the opposite edges of the strip 13 are permanently bonded to the glass sheets by means of fillets 14 at the outer joints of said strip with the glass sheets. The fillets 14 are formed adjacent solder coatings 15 and 16 on metallic coatings 17 and 18 on the glass sheets 11 and 12 and separator strip 13, respectively.

Figure 3:
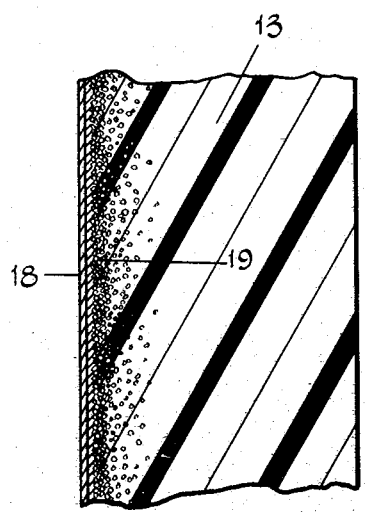
Fig. 3 is a detailed sectional view of the plastic separator strip employed in the unit of Fig. 1.

The coatings 15 and 17 on glass sheets 11 and 12 may be similar to those disclosed in Patent No. 2,235,681, and further may be applied to said sheets in the manner disclosed therein. The separator strip 13 is of a suitable plastic material which will not soften appreciably at soldering temperatures and which has metal particles, indicated generally at 19, embedded in one surface thereof. As shown in Fig. 3, these particles are substantially adjacent to and superimposed upon one another to form a substantially metallic surface onto which is sprayed or otherwise deposited the metallic coating 18. Similarly to metallic coating 17 on the glass sheets, the coating 18 is of a solderable material and is firmly adherent to the metallic surface 19. One type of plastic strip having similar metallic coatings and suitable for the purposes of this invention is a product known as "Teflon" and produced commercially by the Teflon Products Division of the United States Gasket Company. Teflon is a trade name for the polymers of tetrafluoroethylene, the resin of which is made by polymerizing gaseous tetrafluoroethylene to yield a solid granular polymer. Its outstanding properties are its toughness over a wide range of temperatures, its excellent electrical properties over a wide range of frequencies, its chemical inertness, and its heat resistance. Further detailed information pertaining to the composition and properties of tetrafluoroethylene may be found in the "Handbook of Plastics" by Simonds, Weith, and Bigelow, 2d edition (1952), on page 166. It has been found that low melting point solders, such as those forming coatings 15 and 16, can be permanently bonded to strips of this "Teflon" product. As well, the manufacturers of these strips have found them to be substantially water vapor proof.

Multiple glass sheet glazing units made with a plastic separator strip of the type described herein have several distinct advantages, one of which is the ability of the plastic to be deformed readily without cracking or causing the glass to crack when stresses are applied to it as a result of the expansion and contraction of the two sheets of glass 11 and 12. In addition to the advantage of plastic deformation, the plastic separator strips also offer a very decided weight advantage over separator strips made of metal and thus make the overall glazed unit lighter, which facilitates handling in installation and shipping. Also, because of the good insulating properties of the plastic strips, heat transfer between the sheets is kept to a minimum and the insulating efficiency of the multiple sheet unit is increased.

While a thin metallic coating 18 has been shown placed over the metal particles 19, the coating metal is so thin that the different coefficients of expansion of the plastic and metal do not affect the metal by causing a cracking or buckling effect. Furthermore, since the coating is so thin, the amount of heat transfer along the coating is relatively small and the advantages of the plastic strip are not affected.

As shown in Fig. 2, the solder coating 16 is extended over the width of metallic coating 18 of separator strip 13 so as to cover the entire outer surface thereof. In this manner, coating 16 acts as a vapor barrier for the width of the strip between coatings 15 and 17 on the glass sheets. It may be found, however, that for the purposes of this invention the metallic coating 18 on the strip provides an adequate vapor barrier, in which case the solder coating 16 could be applied to only the margins of the outer surface of the strip, as shown, for example, in Fig. 18 of the aforementioned patent.

In any case, however, when prepared in the manner described, the separator strip 13 is disposed on edge between the metallic coated areas on the glass sheets 11 and 12 and approximately centrally of each of said areas. When the strip is so disposed, a soldering iron (not shown) or other suitable heating means may be run along the joint adjacent solder coatings 15 and 16 to deposit molten solder along said joint as well as to elevate the temperature of said coatings to induce flowing thereof to produce fillets 14 having the desirable properties enumerated in the aforementioned patent. As stated therein, the solder from each coating blends or amalgamates into a single mass permanently adherent to the metallic coatings on the glass sheets and separator strips. If desired, metallic coatings may also be deposited on the inner surface of the strip in which case fillets would also be disposed at the joint of said inner surface and the glass sheets.

Figure 4:
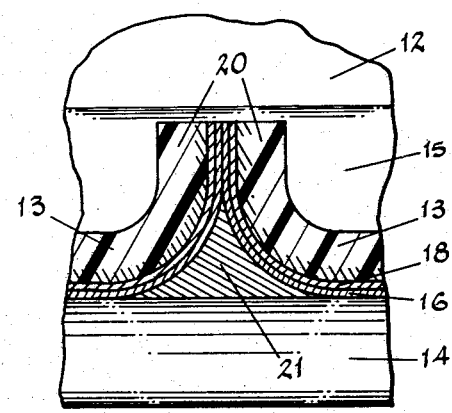
Fig. 4 is an enlarged sectional view of the joinder of the end portions of the separator strip taken along line 4—4 of Fig. 2.

There is shown in Fig. 4 a novel manner in which the opposite ends of the continuous separator strip 13 may be permanently and hermetically sealed together. The strip is cut to a length slightly greater than the total needed at all four sides of the unit and overlapping end portions 20 are turned inwardly at one of said sides such that the solder coatings of each end portion are adjacent one another for a short length and outwardly divergent therefrom to form a V-shaped recess. Within this recess, there is deposited a body of solder 21 which completely fills the length of the recess in bonding with the solder coatings 16 to form an hermetically sealed joint between said end portions 20 of the strip.

The enclosed space within the hermetically sealed unit 10 of this invention may be specially prepared in any suitable manner. For example, one or more sides of the separator strip 13 may be provided with a vent hole (not shown) through which means for dehydrating said space may be inserted. However, the manner and means of preparing the enclosed space do not form a part of this invention and are mentioned only for purposes of illustration.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. A multiple sheet glazing unit comprising a pair of spaced glass sheets, a water vapor proof separator strip disposed between and bonded to the inner marginal portions of said sheets to form an enclosed space therebetween, said strip comprising a continuous flexible length of a resinous plastic material having its opposite end portions turned inwardly in adjacent relation to one another to form a recess therebetween, and a bonding material filling said recess and sealing said end portions together.

2. A multiple sheet glazing unit, comprising a pair of spaced glass sheets, a resinous plastic separator strip arranged between and joining the marginal areas of said sheets, said separator strip being water vapor proof and having metal embedded therein at the surface thereof, and a metallic bonding material at the joiner of said sheets and said separator strip fused to the metal embedded in the said separator strip for hermetically sealing the space between the glass sheets.

3. A multiple sheet glazing unit as defined in claim 2, in which an entire surface of said separator strip is covered with a water vapor proof metallic coating.

4. A multiple sheet glazing unit as defined in claim 2, in which the separator strip is composed of a plastic material which is water vapor proof.

5. A multiple sheet glazing unit as defined in claim 2, in which the separator strip is composed of polymerized tetrafluoroethylene.

6. A multiple sheet glazing unit, comprising a pair of spaced glass sheets, metallic coatings arranged around the inner marginal areas of said sheets and firmly adherent thereto, and a water vapor proof resinous plastic separator strip disposed between the metallic coatings of the spaced glass sheets and having metallic coatings on the surface thereof adjacent to said metallic coatings of the glass sheets, the metallic coatings of said strip and said glass sheets being amalgamated to form a hermetic seal therebetween.

7. A multiple sheet glazing unit as defined in claim 6, in which an entire surface of said separator strip is covered with a water vapor proof metallic coating.

8. A multiple sheet glazing unit as defined in claim 6, in which the separator strip is composed of a plastic material which is water vapor proof.

9. A multiple sheet glazing unit as defined in claim 6, in which the separator strip is composed of polymerized tetrafluoroethylene.

References Cited in the file of this patent

UNITED STATES PATENTS

| | | |
|---|---|---|
| 2,150,355 | Biggers | Mar. 14, 1939 |
| 2,235,681 | Haven et al. | Mar. 18, 1941 |
| 2,273,733 | Paddock | Feb. 17, 1942 |